(12) United States Patent
Vawter

(10) Patent No.: US 8,116,734 B2
(45) Date of Patent: Feb. 14, 2012

(54) PARTY IDENTIFICATION IN A WIRELESS NETWORK

(75) Inventor: Jamison Vawter, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 977 days.

(21) Appl. No.: 11/466,215

(22) Filed: Aug. 22, 2006

(65) Prior Publication Data

US 2008/0052091 A1 Feb. 28, 2008

(51) Int. Cl.
*H04M 1/66* (2006.01)
(52) U.S. Cl. ..... 455/411; 455/406; 455/408; 455/422.1; 455/41.1; 455/41.2
(58) Field of Classification Search ............... None
See application file for complete search history.

(56) References Cited

U.S. PATENT DOCUMENTS

| 7,127,236 | B2* | 10/2006 | Khan et al. ............ 455/414.1 |
| 7,330,714 | B2* | 2/2008 | Rosenberg ............. 455/412.1 |
| 2004/0127256 | A1* | 7/2004 | Goldthwaite et al. ....... 455/558 |
| 2008/0041937 | A1* | 2/2008 | Vawter ..................... 235/380 |
| 2008/0048022 | A1* | 2/2008 | Vawter ..................... 235/380 |

* cited by examiner

*Primary Examiner* — Willie J. Daniel, Jr.

(57) ABSTRACT

A managed service may include first logic to receive identification information from a mobile device and send an authorization to a transaction device indicating that the mobile device is identified, the identified mobile device to participate in a transaction with the transaction device. The first logic may receive payment information from the mobile device during the transaction and send payment to the transaction device on behalf of the mobile device during the transaction. The managed service may include second logic to determine whether the identity information is valid by comparing the identity information to stored identity information and generate the authorization when the identity information is valid. The second logic may process the payment information on behalf of the mobile device, allocate a debit or a credit to an account maintained on behalf of the mobile device, and send the payment to the first logic.

19 Claims, 8 Drawing Sheets

500

| CLIENT ID: BOB MARLEY | | | ADDRESS: 714 HAPPY TRAIL LANE | |
|---|---|---|---|---|
| DATE: 6/1/2006 0930 | | | ACCOUNT #: VZ-444-222 | |
| AUTHENTICATION INFORMATION: B.M.-001.DAT | | | | |
| ENTITY ID | ENTITY ACCT. # | ENTITY ADDRESS | DESCRIPTION | COMMENTS |
| VISA | 4519223351545332 | VISA.COM | CREDIT CARD | VALID |
| PAYPAL | 0023-5555 | PAYPAL.COM | TRANSACTION ACCOUNT | VALID |
| JIM'S BAIT | BM-123 | 192.1.205.21 | MERCHANT ACCOUNT | ON HOLD |
| ⋮ | ⋮ | ⋮ | ⋮ | |
| DOMINOS | 666-11-123 | DOMINOS.COM | MERCHANT ACCOUNT | CANCELED |

FIG. 5

PARTY IDENTIFICATION IN A WIRELESS NETWORK

BACKGROUND OF THE INVENTION

Electronic transactions may increase the speed and/or accuracy of transactions between two devices. For example, a customer may receive an electronic receipt that exactly matches records maintained by a merchant when a transaction is performed electronically (e.g., when the customer makes an online purchase).

Some customers, however, may be unwilling to engage in electronic transactions in certain point of sale/service situations (e.g., while shopping in a mall) because the customer may be reluctant to trust a sales clerk, for example, with his/her financial information (e.g., credit card information and/or other identifying information).

Higher relative transaction costs may be incurred from performing transactions in a conventional manner (e.g., via plastic credit cards, paper receipts, handwritten signatures, driver's license verification, etc.) as compared to electronic transactions. The higher transaction costs incurred from customers' unwillingness to engage in electronic transactions is borne by merchants and/or the customer's themselves.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 5 illustrates an exemplary data structure to store client information on a server;

DETAILED DESCRIPTION OF PREFERRED EMBODIMENTS

Figure 1:
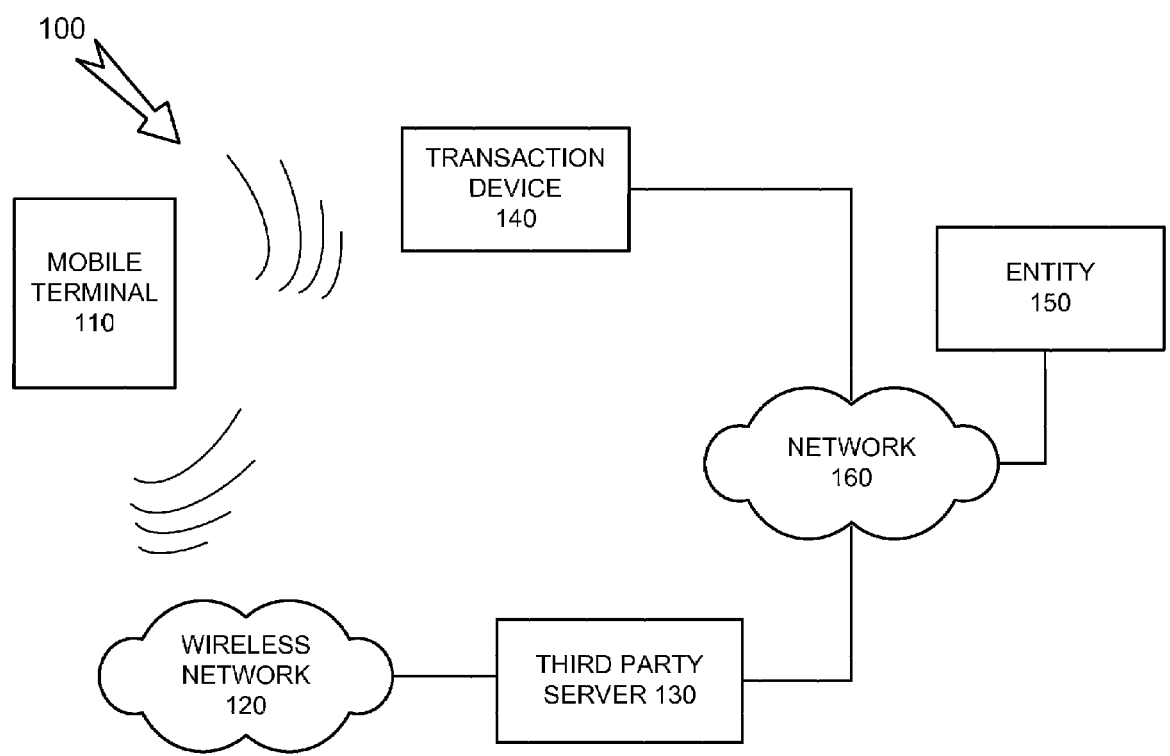
FIG. 1 illustrates an exemplary system that can be configured to operate in accordance with principles of the invention.

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may provide customers and merchants with a way to perform secure electronic transactions using a trusted third party. Implementations may allow transactions to occur without an exchange of sensitive financial information between the merchant and the customer. For example, a customer may position a cell phone near a radio frequency identification (RFID) reader associated with a cash register. The cash register may send an RFID query to the cell phone that identifies the merchant and/or the register.

The cell phone may forward the merchant information and send information that identifies the cell phone to a trusted third party (e.g., a trusted server). The trusted third party may verify the identity of the cell phone and may send an authentication to the merchant that identifies the cell phone as being a legitimate cell phone (where phones determined to be legitimate may engage in wireless transactions with the merchant). The cash register may send a payment request to the cell phone as the transaction completes and/or nears completion. In an alternative implementation, the merchant may contact a trusted server to have an identity of the cell phone validated.

The cell phone may specify a payment type (e.g., a credit card number) and may send the payment information to the trusted third party along with information that identifies the current transaction with the merchant. The trusted third party may contact a credit/debit card issuer and may receive payment on behalf of the cell phone. The trusted third party may send payment to the cash register on behalf of the cell phone.

The cash register may send payment confirmation to the cell phone and/or server. The cash register may further send a receipt to the cell phone, where the receipt documents the transaction. In one implementation, the trusted third party may operate a managed service that is provided to the cell phone and/or to the cash register on a subscription basis (e.g., for a monthly fee). Subscribers of the managed service may be able to engage in secure wireless transactions without having to provide financial information to another party in the transaction.

As used herein, "consumer," "customer," and/or "user" may refer to an individual that can engage in a transaction. A consumer/customer/user may be associated with a device (e.g., a mobile terminal), a group (e.g., employees of a corporation, students at a school, members of a frequent shopper club, etc.), a location (e.g., a neighborhood, city, etc.), etc. "Transaction" may refer to an exchange of information between two parties, such as a customer and a retailer, and/or between two devices operated on behalf of the parties (e.g., a cell phone and a register). A transaction may include a purchase, an exchange, a credit, cashback, a refund, a request for services, etc. In one implementation, a transaction may include the exchange of financial information (e.g., electronic money, credit card information, automated teller machine (ATM) information, etc.), for example, associated with an electronic fund transfer (EFT).

Implementations and processes for party identification in a wireless network as described herein may be incorporated into various devices and/or systems and/or may be used with a number of techniques, such as those described in U.S. patent application Ser. No. 11/465,271 entitled "Multi-Function Transaction Device" filed on Aug. 17, 2006; in U.S. patent application Ser. No. 11/465,935 entitled "Secure Near Field Transaction" (and issued as U.S. Pat. No. 7,748,618) filed on Aug. 21, 2006; in U.S. patent application Ser. No. 11/463,326 entitled "Transaction Information Mining" (and issued as U.S. Pat. No. 7,823,772) filed on Aug. 9, 2006; and in U.S. patent application Ser. No. 11/466,544 entitled "Virtual Wallet" ( (and issued as U.S. Pat. No. 7,708,194) filed on Aug. 23, 2006, the content of the above applications are incorporated herein by reference in their entireties, respectively.

FIG. 1 illustrates an exemplary system 100 that can be configured to operate in accordance with principles of the invention. System 100 may include a mobile terminal 110 (hereinafter terminal 110), a wireless network 120, a third party server 130 (hereinafter server 130), a transaction device 140, an entity 150, and a network 160.

Terminal 110 may include a device that exchanges information with a destination. For example, terminal 110 may include a handheld device, such as a web-enabled cellular telephone, an Internet protocol (IP) telephone, a personal digital assistant (PDA), a computer, such as a laptop computer, a plain old telephone system (POTS) device, etc. Other implementations of terminal 110 may include other devices, such as a server and/or another computation or communication device.

In one implementation, terminal 110 may include hardware or software to establish a secure communication session with a destination, such as transaction device 140 and/or wireless network 120. Terminal 110 may be adapted to perform near field wireless communication, e.g., communication over a distance of several inches to a few feet, and/or far field communication, e.g., communication over substantially any distance.

In one implementation, terminal 110 may exchange financial information (e.g., a credit card number) with a trusted third party. The trusted third party may process the financial information and may send payment to a destination on behalf of terminal 110 without providing the financial information to the destination.

Terminal 110 may be configured to store information about one or more transactions and/or may send and/or receive transaction information to/from another device, such as transaction device 140 and/or server 130. For example, terminal 110 may store information about a sales transaction, such as information about purchased items, item prices, a location where items were purchased, payment method information, etc. Terminal 110 may further send the stored information to a destination, such as a remote storage device.

Wireless network 120 may include a network that transfers information. Implementations of wireless network 120 may include cellular networks and/or other types of wireless networks, such as ad hoc wireless networks, free-space optical networks, etc. Wireless network 120 may send and/or receive information via packet-based or non-packet based exchanges. In one implementation, wireless network 120 may be operated by a service provider that provides wireless communication services to a customer, such as a user of terminal 110, as a managed service (e.g., for a monthly fee).

Server 130 may include a device that receives information from, or transmits information to, another device and/or network. For example, server 130 may include a workstation, desktop computer, laptop computer, PDA, web-enabled cellular telephone, Wi-Fi device, or another type of network device. Server 130 may run applications, such as server applications, service provisioning applications, authentication and/or authorization applications, database applications, email applications, reporting applications, communication applications (e.g., wireless communication applications), e-commerce applications, etc.

In one implementation, server 130 may provide a service, such as a managed service, to other devices in system 100, such as terminal 110 and/or transaction device 140. For example, server 130 may provide communication services to terminal 110, transaction storage services to transaction device 140 and/or terminal 110, third party verification services, to other devices in system 100, etc.

Server 130 may operate as a trusted third party on behalf of terminal 110 and/or transaction device 140. For example, terminal 110 and transaction device 140 may engage in a transaction session (e.g., a purchase transaction). Terminal 110 may send financial information to server 130 that server 130 may process to produce a result on behalf of terminal 110. Server 130 may send the result to transaction device 140, where the result identifies terminal 110 as being legitimate without divulging potentially sensitive financial information about terminal 110 to transaction device 140. Server 130 may operate as a trusted third party to substantially any number of devices in system 100 and/or for substantially any number of transactions.

Transaction device 140 may include a device that performs a transaction on behalf of a customer or device. For example, transaction device 140 may include a cash register operated by a retailer, a transaction server operated by a web-based retailer, a computer operated by a government agency (e.g., a department of motor vehicles), a computer operated by a hospital or doctor's office, etc. Transaction device 140 may communicate with terminal 110 via a near field wireless link, a far field wireless link, and/or other types of links (e.g., a hard wired link) while performing a transaction on behalf of terminal 110. Transaction device 140 may further communicate with server 130 regarding the transaction, such as by sending transaction details to server 130 via a network, a far field wireless link, etc.

Entity 150 may include a device that communicates with server 130 on behalf of terminal 110 and/or another device in system 100. In one implementation, entity 150 may include a server associated with a credit/debit card issuer that maintains a credit card account associated with a user of terminal 110. Server 130 may exchange account related information (e.g., an account number, expiration date, a transaction amount, etc.) with entity 150 when terminal 110 transacts with transaction device 140 and/or another device.

Network 160 may include any network capable of transferring information. Implementations of network 160 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc.

Network 160 may include network devices, such as routers, switches, firewalls, gateways, and/or servers (not shown). Network 160 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Figure 2:
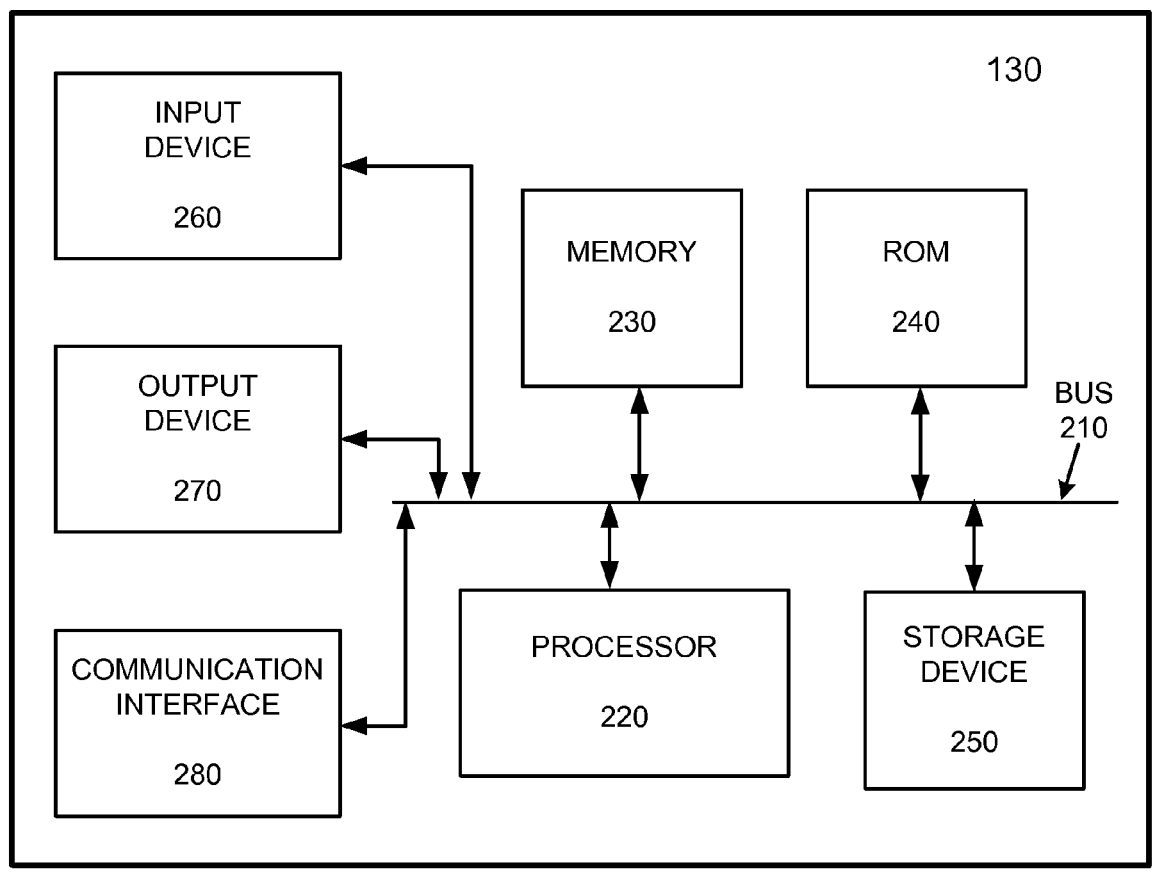
FIG. 2 illustrates an exemplary architecture for implementing the server of FIG. 1.

FIG. 2 illustrates an exemplary architecture for implementing server 130. It will be appreciated that terminal 110, transaction device 140, entity 150, and/or other devices (not shown) that can be used in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as terminal 110, transaction device 140, and/or entity 150. For example, communication interface 280 may include a modem, an Ethernet interface, a wireless interface, and/or a port. Alternatively, communication interface 280 may include other mechanisms for communicating via a network, such as network 160.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Figure 3:
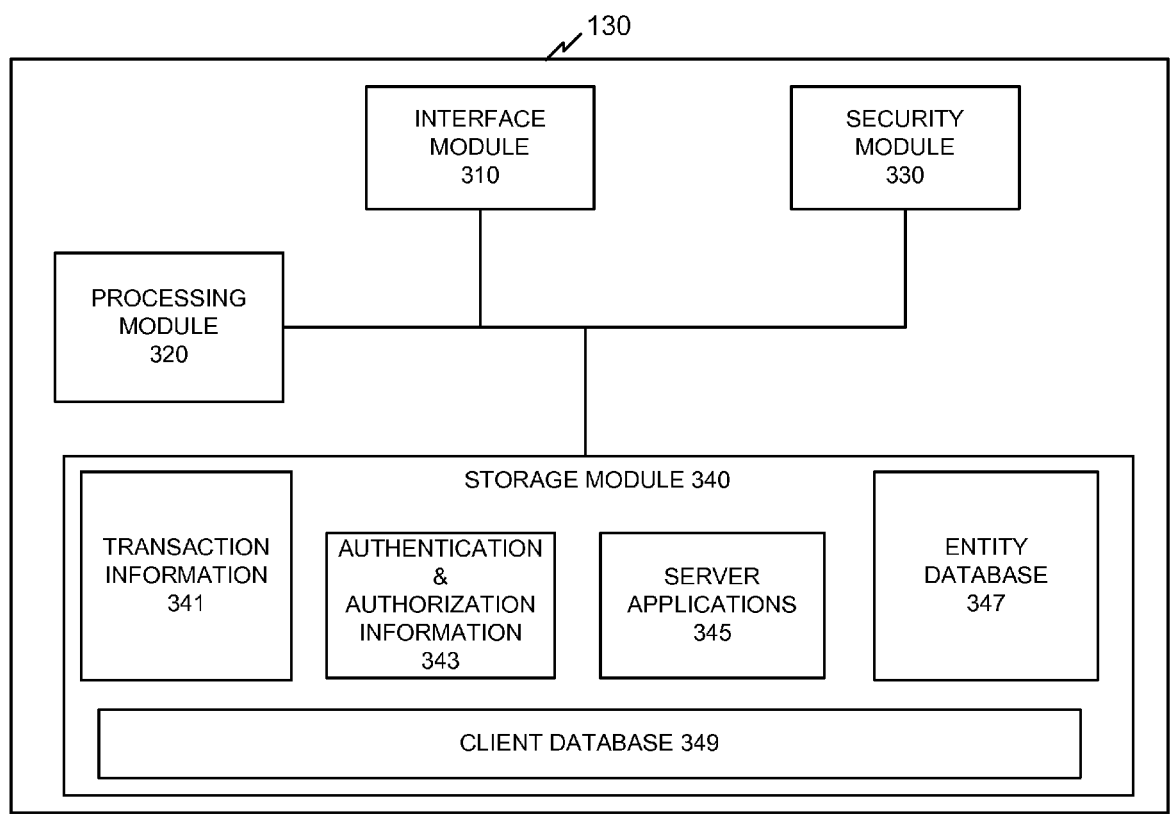
FIG. 3 illustrates an exemplary functional diagram of the server of FIG. 1.

FIG. 3 illustrates an exemplary functional diagram of server 130. Server 130 may implement hardware or software based logic to operate as a service provisioning device, an authorization device, a remote storage device, etc. Implementations of server 130 may operate on behalf of devices on wireless network 120 and/or network 160, such as terminal 110, transaction device 140, and/or entity 150.

An implementation of server 130 may include an interface module 310, a processing module 320, a security module 330, and a storage module 340.

Interface module 310 may include hardware or software based logic to send and/or receive information. For example, interface module 310 may include first logic to implement a mobile terminal interface to send information to and/or to receive information from terminal 110. The mobile terminal interface may include a transceiver that sends and receives wireless data to/from terminal 110 via wireless network 120. Implementations of a mobile terminal interface may be adapted to send and receive encrypted information and/or non-encrypted information.

Interface module 310 may include second logic to implement a transaction device interface to exchange information with transaction device 140 via network 160. For example, a transaction device interface may include a network interface configured to exchange encrypted or non-encrypted transaction information with transaction device 140. Interface module 310 may include still other types of logic to implement other types of interfaces, such as an interface that allows server 130 to exchange information with entity 150.

Processing module 320 may include hardware or software based logic to process instructions related to providing services to terminal 110, transaction device 140, and/or entity 150, exchanging information with devices in system 100, processing data related to transactions for devices in system 100, storing transaction information on behalf of devices in system 100, etc. Processing module 320 may be implemented in a standalone or distributed configuration, such as by being distributed across one or more devices.

Security module 330 may include hardware or software based logic to identify a user of terminal 110 or a user of another device in system 100, to identify a device in system 100, and/or to determine whether a user/device is authorized to access a destination, participate in a communication session (e.g., interacting with a transaction device), and/or receive information (e.g., receiving a token from server 130).

Security module 330 may generate authorization mechanisms and/or may operate with authorization devices and/or mechanisms, such as password generators, pseudo-random number generators, passwords, tokens, biometric identifiers, secure identification (secure ID) values, and/or other identifiers to establish an identity of a user or device. For example, security module 330 may generate a token that allows terminal 110 and/or transaction device 140 to access another device.

Security module 330 may process authorization mechanisms received from a sending device to authenticate the sending device to another device in system 100. For example, security module 330 may receive a token from terminal 110. Server 130 may process the token to determine whether terminal 110 is valid. Security module 330 may generate an authorization message and may send the authorization message to transaction device 140. The authorization message may identify whether an identity of terminal 110 has been validated.

In an implementation, security module 330 may include radio frequency identification (RFID) logic to allow devices in system 100 to perform validations and/or exchange information via RFID based techniques. For example, security module 330 may verify the identity of terminal 110 for transaction device 140 when transaction device 140 receives an RFID signal from terminal 110 that contains information identifying terminal 110.

In a second implementation, security module 330 may include logic to operate with secure ID based information. For example, security module 330 may issue secure ID tokens to devices, may process secure ID tokens received from devices, etc. Other implementations of security module 330 may be implemented in other ways, and may operate with encrypted and/or non-encrypted information when authorizing a user or device.

Storage module 340 may include hardware or software based logic to store information related to users, devices operated by users, transactions, payment information, account information, authentication information, etc. Storage module 340 may be implemented in server 130 and/or may be remote to server 130 and connected thereto via a link. Storage module 340 may be implemented in memory 230, ROM 240 and/or storage device 250. In one implementation, storage module 340 may include transaction information 341, authentication and authorization information 343, applications 345, entity database 347, and client database 349.

Transaction information 341 may include information related to a transaction. For example, transaction information 341 may include information about items purchased, quantities of items purchased, price, discounts, tax, date/time information related to a transaction, a transaction identifier, a merchant identifier, a location identifier, a payment type, etc. Transaction information 341 may further include other types of information, such as information exchanged between server 130 and transaction device 140 regarding terminal 110 during a transaction between terminal 110 and transaction device 140.

Authentication and authorization information 343 may include information related to the authentication, authorization, validation, and/or identification of a user and/or device (e.g., terminal 110, transaction device 140, entity 150, etc.) in system 100. Authentication and authorization information 343 may include a user name, password, personal identification number (PIN), token, secure ID value, electronic serial number (ESN), certificate, watermark, merchant identifier, transaction identifier, code (e.g., a script), etc. In one implementation, security module 330 may use authentication and authorization information 343 when performing security related functions associated with server 130.

Server applications 345 may include software applications residing on server 130. Server applications 345 may include communication applications, database applications, location tracking applications, accounting applications, transaction processing applications, transaction storage applications, data compression applications, etc.

Entity database 347 may include information related to entity 150. For example, entity database 347 may include contact information for entity 150 (such as a universal resource locator (URL), telephone number, etc.), codes for accessing an application running on entity 150, etc.

Client database 349 may include information related to a client, such as terminal 110 and/or a user of terminal 110. For example, server 130 may provide services to terminal 110 as managed services on a subscription basis. A user of terminal 110 may subscribe to the managed service and may provide a name, address, account information for transactions (e.g., credit card account and/or bank account information), a telephone number and/or other type of identifier for mobile terminal 110, a list of preferred merchants (e.g., names of merchants for which server 130 should process transactions), etc. Client database 349 may further include information related to transactions that terminal 110 has completed with merchants. For example, client database 349 may include electronic records of prior transactions.

Figure 4:
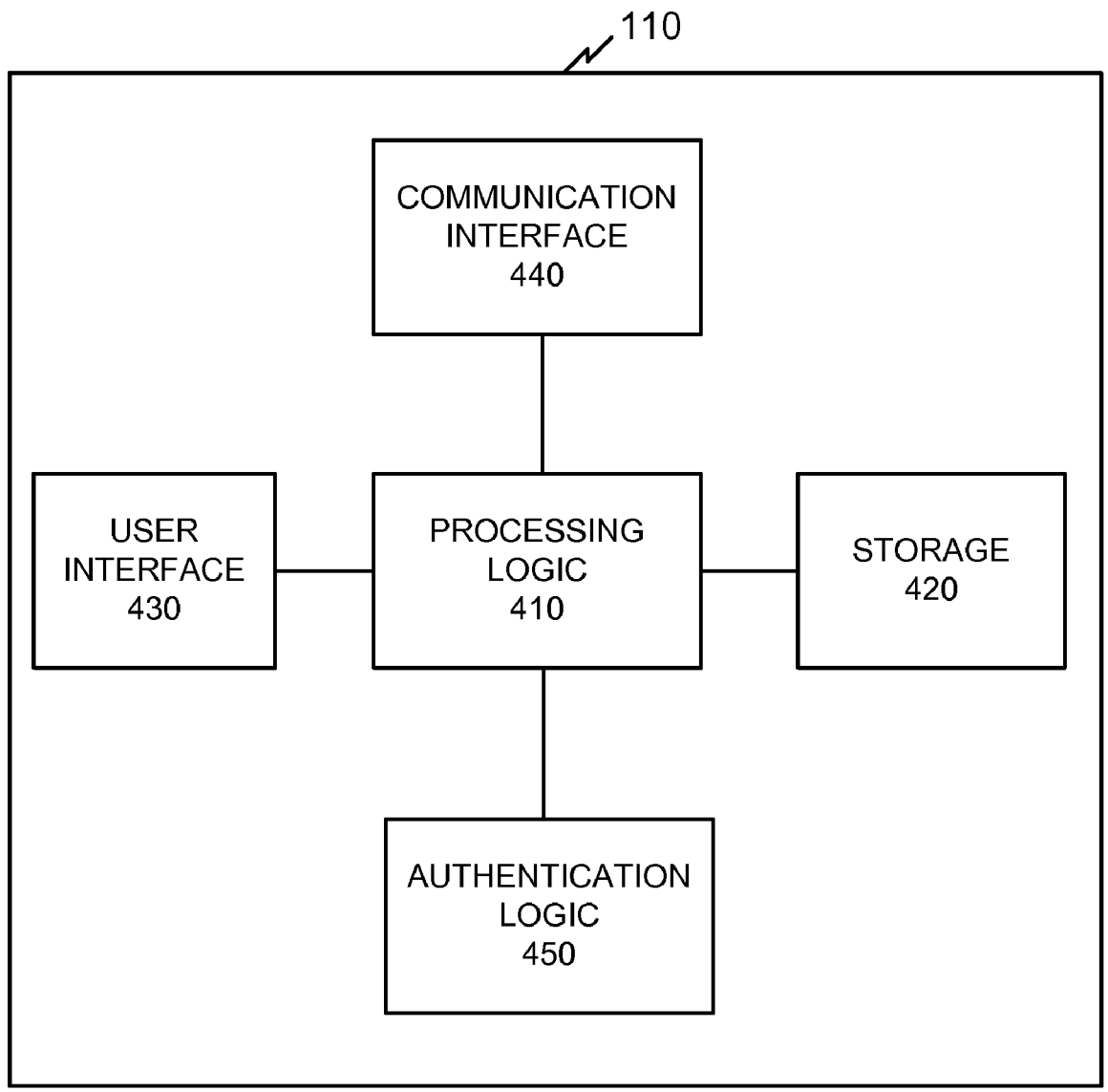
FIG. 4 illustrates an exemplary functional diagram of the mobile terminal of FIG. 1.

FIG. 4 illustrates an exemplary functional diagram of terminal 110. An implementation of terminal 110 may include processing logic 410, storage 420, user interface 430, communication interface 440, and authentication logic 450.

Processing logic 410 may include hardware or software to process instructions related to operating terminal 110. For example, processing logic 410 may process instructions to allow terminal 110 to receive a token, to establish a secure communication session with transaction device 140, to engage in a transaction with transaction device 140, and/or to establish communication sessions with other devices in system 100. Processing logic 410 may be implemented in a standalone or distributed configuration, such as by being distributed across one or more devices.

Storage 420 may include hardware or software based logic to store information related to transactions, payments, accounts, calendars, phone/address books, images, text, music, navigation applications, etc. Storage 420 may be implemented locally in terminal 110 and/or may be remote to terminal 110 and connected thereto via a link, e.g., when server 130 provides remote storage capabilities to terminal 110.

User interface 430 may include hardware or software based logic that allows a user to interact with terminal 110. User interface 430 may include a keypad or other input device, a display, a speaker, a microphone, a tactile actuator (e.g., a vibrating device), control keys, etc. For example, user interface 430 may display mirrored data received from transaction device 140 onto a display device of terminal 110 during a transaction. In another implementation, user interface 430 may allow a user of terminal 110 to enter a secure PIN to facilitate transactions with server 130 and/or transaction device 140.

Communication interface 440 may include hardware or software based logic that allows terminal 110 to communicate with other devices. Implementations of communication interface 440 may include an antenna, a transmitter that may convert baseband signals from processing logic 410 to radio frequency (RF) signals and/or a receiver that may convert RF signals from the antenna to baseband signals. Alternatively, communication interface 440 may include a transceiver that performs the functions of both a transmitter and a receiver. Communication interface 440 may operate with other components, such as processing logic 410, user interface 430 (e.g., a display device) and/or authentication logic 450 when establishing a communication session on behalf of terminal 110.

Communication interface 440 may include a near field communication component that allows terminal 110 to participate in communication sessions over short distances, such as distances up to several feet (e.g., on the order of 30 feet) and a far field communication component that allows terminal 110 to participate in communication sessions over substantially any distance (e.g., communicating with a cell tower that is located several miles away from terminal 110 and/or communicating with a satellite).

Assume, for sake of example, that terminal 110 may receive a query from a radio frequency identification (RFID) transmitter on transaction device 140. Terminal 110 may process the signal, and communication interface 440 may make information, such as a reply that identifies terminal 110, available to transaction device 140 via a near field communication signal. Communication interface 440 may be adapted to send and/or receive communication signals via RF, free-space optical, and/or free-space acoustic waveforms.

Authentication logic 450 may include hardware or software based logic that allows terminal 110 to establish its identity with another device. Authentication logic 450 may include logic that allows terminal 110 to receive and/or generate a token, such as a string of digits that can be used to identify terminal 110 with respect to other devices in system 100, such as server 130. Authentication logic 450 may further allow a user of terminal 110 to enter information, such as a password, PIN, answer to a prompt, etc., to establish an identity of terminal 110.

For example, in an implementation, authentication logic 450 may send a rolling code to a device in response to a query, where the rolling code is adapted to uniquely identify terminal 110 so as to discourage spoofing by another party, such as a party operating a malicious device (eavesdropper) in system 100. Authentication logic 450 may allow terminal 110 to participate in secure sessions with devices in system 100 when terminal 110 is validated to the devices.

In one implementation, authentication logic 450 may include an RFID chip that includes an electronic serial number (ESN). The RFID chip may receive a query from an RFID transceiver (e.g., a reader and a transmitter) and may provide an ESN to server 130 and/or transaction device 140 in response to the query, where the ESN uniquely identifies terminal 110. An ESN may be combined with other types of identifiers to identify terminal 110 to other devices. For example, in one implementation, terminal 110 may employ a secure identification value (SIV) that may include an ESN, a secure ID token (e.g., a rolling code), and/or a PIN. Terminal 110 may provide the SIV in response to a query, such as an RFID query, to identify terminal 110 to the device that sent the query and/or to identify terminal 110 to another device in system 100.

In another implementation, authentication logic 450 may include a secure identification (secure ID) value, e.g., a token, that is synchronized with another device, such as server 130. Terminal 110 may provide the secure ID token to transaction device 140 in response to a request, and transaction device 140 may verify the token via the other device (e.g., server 130).

In still another implementation, authentication logic 450 may include an RFID scanner, or another type of scanner, to allow terminal 110 to participate in peer-to-peer secure communication sessions. For example, a peer-to-peer secure communication session may occur when terminal 110 exchanges transaction information with a wireless PDA operated by another user, such as user hosting a yard sale.

FIG. 5 illustrates an exemplary data structure 500 to store client information. Data structure 500 may include information arranged in a table format to facilitate use by an individual, such as a system administrator. Data structure 500 may reside in server 130, transaction device 140, entity 150, terminal 110, etc. The implementation of data structure 500 discussed in connection with FIG. 5 is exemplary and other implementations of data structure 500 are possible. Other implementations of data structure 500 may include more fields or fewer fields.

An implementation of data structure 500 can include client ID 510, address 520, date 530, account number 540, authentication information 550, entity ID 560, entity account number 570, entity address 580, description 590, and comments 595.

Client ID 510 may include information that identifies a client associated with an account on server 130. For example, client ID 510 may identify a person, an establishment (e.g., a business), an institution (e.g., a school), an agency, etc. Address 520 may include information that identifies an address for a client identified by client ID 510. Date 530 may include information that identifies a date when data structure 500 was created, modified, saved, etc. Account number 540 may include information that identifies an account associated with the client identified by client ID 510.

Authentication information 550 may identify information that can be used to establish an identity of one or more devices associated with a client. For example, identity information may include a name, an address, a phone number, an electronic serial number, a social security number, a driver's license number, passport information, access information, credit card information, debit card information, a receipt identifier, order information, account information, a PIN, a token, a password, a seed, a SIV, a secure ID, code, etc. Authentication information 550 may further include information that identifies a location, or a link to a location, where authentication information related to a client can be found. For example, authentication information 550 may identify a file that contains passwords, tokens, and/or other information used to identify terminal 110 or a user of terminal 110 related to client ID 510.

Entity ID 560 may include information that identifies an entity, such as an entity 150. For example, entity ID 560 may include names of one or more parties that maintain monetary accounts associated with terminal 110, such as credit card accounts, bank accounts, debit card accounts, lines of credit, etc. Entity account number 570 may include information that identifies an account maintained by an entity identified via entity ID 560 on behalf of terminal 110 (client ID 510).

Entity address 580 may include contact information associated with an entity identified via entity ID 560. For example, "Jim's Bait and Tackle" may be reached via an internet protocol (IP) address of 192.1.205.21. Server 130 may contact Jim's Bait and Tackle when terminal 110 is used there in a transaction.

Description 590 may include information related to an entity in entity ID 560. In one implementation, description 590 may identify an account type that is related to an entity. Comments 595 may include information that is related to other information in data structure 500. For example, a customer service representative associated with server 130 may place annotations about a client's account in comments 595.

Figure 6:
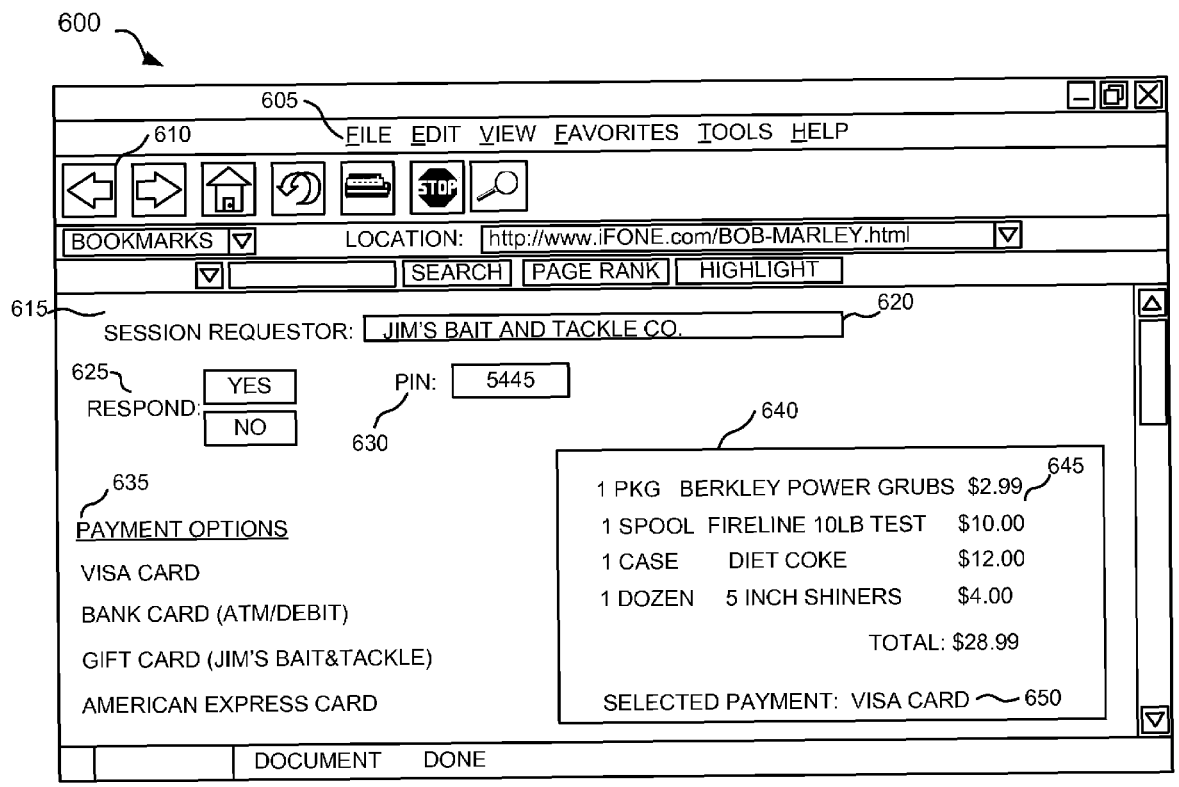
FIG. 6 illustrates an exemplary mobile terminal interface for interacting with a server.

FIG. 6 illustrates an exemplary user interface 600 that can be used by terminal 110 to perform a transaction. A user of terminal 110 may interact with user interface 600 while performing a transaction with transaction device 140. Interface 600 may include information that allows terminal 110 to contact server 130 to have its identity validated and to authorize a payment to transaction device 140, for example, via an EFT.

In one implementation, interface 600 may include drop down menus 605, shortcuts 610, window 615, requestor window 620, respond button 625, PIN field 630, payment options 635, and transaction window 640.

Drop down menus 605 may include links to commonly used functions, such as a save file command, a copy command, a screen refresh command, etc. Shortcuts 610 may include radio buttons that perform operations on behalf of a user, such as displaying information from a previous browser page, scrolling to a browser page, printing, stopping a page refresh or download operation, etc.

Window 615 may include a display area in which information is displayed via terminal 110. For example, window 615 may include an area of a browser page. Requestor window 620 may identify a device that is seeking to transact with terminal 110. For example, transaction device 140 may send an RFID query to terminal 110 requesting that terminal 110 identify itself. Respond 625 may include one or more radio buttons that allow a user of terminal 110 to accept or decline an invitation for a session. For example, a user may select "yes" using a pointing device. Accepting the invitation may cause terminal 110 to send identifying information to server 130 so that server 130 can inform transaction device 140 that terminal 110 is legitimate and that terminal 110 can participate in a transaction with transaction device 140. Selecting "no" may send a message to transaction device 140 indicating that terminal 110 desires not to initiate a transaction.

PIN 630 may allow a user of terminal 110 to enter a PIN, or other type of identifier, to establish an identity of terminal 110 and/or a user thereof. For example, a user may enter a four digit number into PIN 630 and may send the information to server 130 to establish an identity of terminal 110. Information in PIN 630 may be sent to server 130 alone or in combination with other information, such as a token or other type of identifier.

Payment options 635 may include information that identifies one or more sources of payment that can be used by terminal 110. In one implementation, enumerated payment options 635 may be linked to drop down menus that allow a user of terminal 110 to enter information (e.g., a PIN) and/or to make selections with respect to a selected entry (e.g., selecting a particular credit card number from a list of credit card numbers).

Transaction window 640 may include information related to a transaction when terminal 110 has selected "yes" for respond 625. Transaction window 640 may include a list of one or more purchased items when terminal 110 is used in a sales transaction. For example, transaction window 640 may include an electronic receipt that includes items 645 purchased by a user of terminal 110. Transaction window 640 may identify a selected payment type 650 selected by terminal 110. For example, a user may select "Visa Card" in payment options 635 and "Visa Card" may appear in a portion of transaction window 640 as selected payment type 650.

Figure 7:
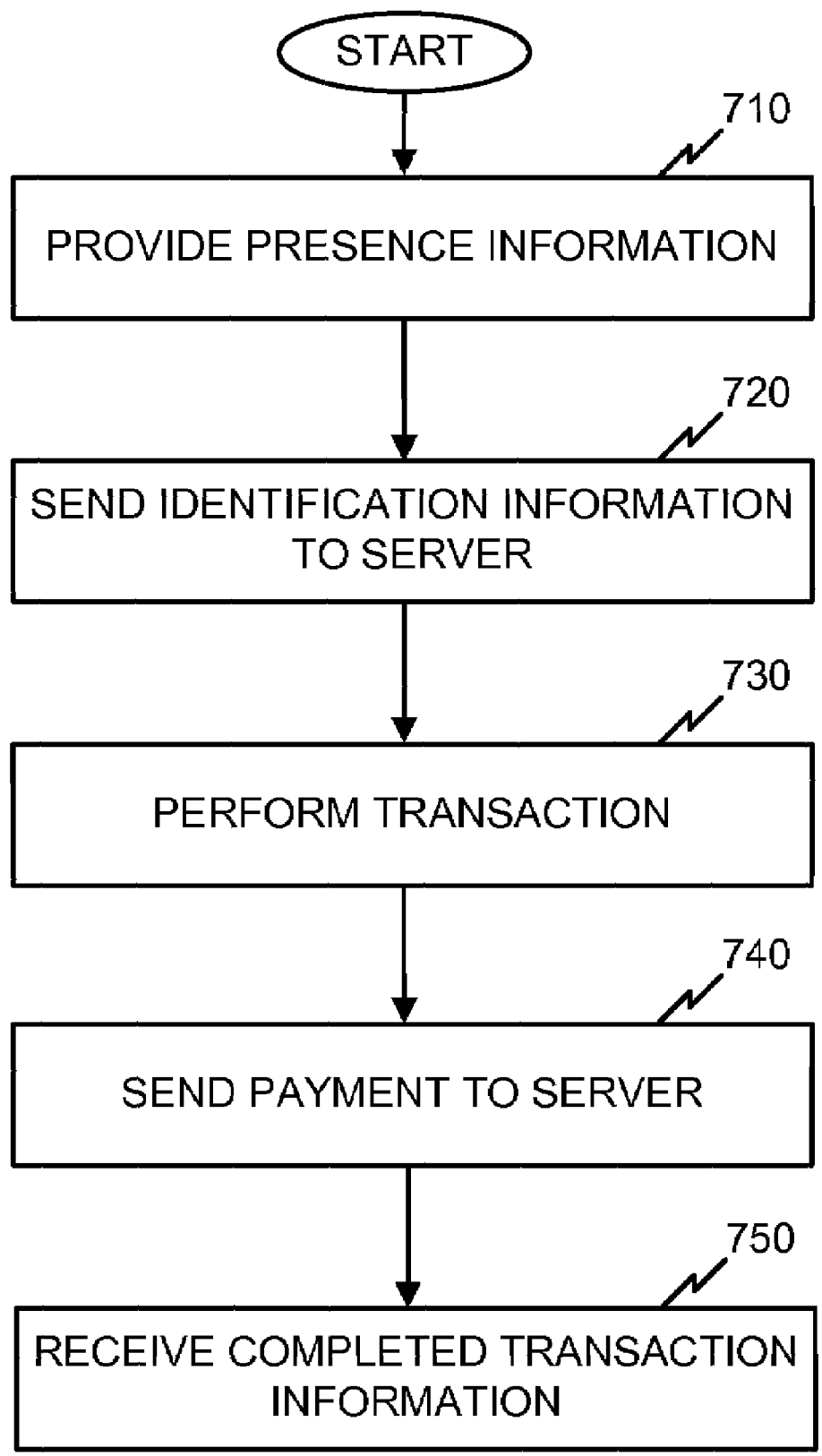
FIG. 7 illustrates exemplary processing for an interaction between a mobile terminal and a transaction device.

FIG. 7 illustrates exemplary processing for an interaction between mobile terminal 110 and transaction device 140. Mobile terminal 110 may make its presence known to transaction device 140 (block 710). In one implementation, a user of terminal 110 may pass terminal 110 over an RFID reader coupled to transaction device 140. The RFID reader may sense terminal 110 and may send an RFID query to terminal 110 via a secure near field wireless link. The RFID query may request identifying information from terminal 110 so that a transaction session can be established between transaction device 140 and terminal 110.

Terminal 110 may receive the RFID query. Terminal 110 may send its identification information to server 130 (block 720). Server 130 may act as a trusted third party to a transaction between terminal 110 and transaction device 140 and may authenticate terminal 110 to transaction device 140. In one implementation, terminal 110 may send a SIV to server 130. For example, terminal 110 may display interface 600 on a display device when the RFID query is received from transaction device 140. The name of the requesting party (merchant) may appear in session requester 620. A user of terminal 110 may enter a PIN number via PIN 630 and may select "yes" via respond 625. Terminal 110 may send identifying information to server 130 via a secure far field wireless link.

Server 130 may validate the identity of terminal 110 to transaction device 140. Terminal 110 and transaction device 140 may perform a transaction when terminal 110 is validated (block 730). For example, a user of terminal 110 may purchase items during a transaction. Transaction device 140 (e.g., a register) may record scanned items, and information about the items may appear on a display of transaction device 140 and terminal 110. For example, terminal 110 may display information about purchased items in transaction window 640. Transaction device 140 may send a payment request to terminal 110 when items to be purchased have been registered.

Upon receiving the payment request, terminal 110 may send payment information to server 130 (block 740). In one implementation, server 130 may act as a secure third party payment device in a transaction between terminal 110 and transaction device 140. For example, a user of terminal 110 may select Visa Card from payment options 635 and may send information related to a Visa Card (e.g., credit card number and expiration date) to server 130. Server 130 may process the payment and may send payment to transaction device 140 on behalf of terminal 110. Terminal 110 may receive completed transaction information from transaction device 140 when transaction device 140 has received payment (block 750). For example, transaction device 140 may send a record of the transaction, e.g. a final sales receipt, to terminal 110. Terminal 110 may store the sales receipt in storage 420 and/or may send the sales receipt to server 130 for storage thereon, such as for storage in an account related to terminal 110. The sales receipt may complete the transaction between terminal 110 and terminal 140.

Figure 8:
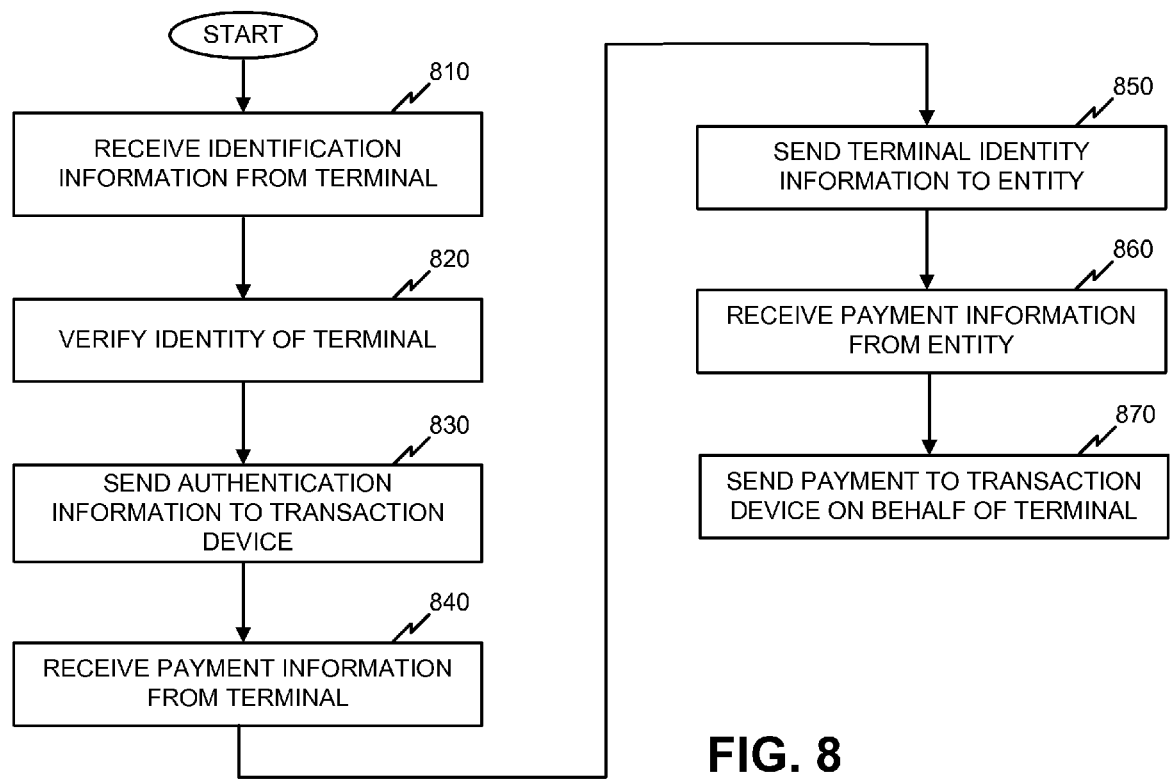
FIG. 8 illustrates exemplary processing for performing third party verification of a mobile terminal.

FIG. 8 illustrates exemplary processing for performing third party verification of mobile terminal 110. Server 130 may receive identification information from terminal 110 (block 810). In one implementation, terminal 110 may send a SIV to server 130 to establish its identity. Terminal 110 may further send information that identifies transaction device 140 so that server 130 can contact transaction device 140 on behalf of terminal 110.

Server 130 may verify the identity of terminal 110 (block 820). Server 130 may maintain information that identifies terminal 110 in authentication and authorization information 343 and/or client database 349. Server 130 may compare information received from terminal 110 with information stored on server 130. Server 130 may determine whether terminal 110 is valid based on the comparison. For example, server 130 may receive a token and a PIN from terminal 110 and may compare a token copy and a stored PIN to the token and PIN received from terminal 110. Server 130 may determine that terminal 110 is valid when the token matches the token copy and when the PIN matches the stored PIN.

Server 130 may send authentication information to transaction device 140 on behalf of terminal 110 (block 830). In one implementation, server 130 may send a message to transaction device 140 indicating that terminal 110 is legitimate. In another implementation, server 130 may send a key to transaction device 140 and may send another key to terminal 110 to allow terminal 110 and transaction device 140 to establish a secure link therebetween using the keys. Transaction device 140 may establish a secure near field wireless communication session with terminal 110 when terminal 110 is validated. In one implementation, transaction device 140 may establish a Bluetooth session with terminal 110. In other implementations, transaction device 140 may establish other types of links.

Server 130 may receive payment information from terminal 110 (block 840). For example, server 130 may receive payment information when a transaction between terminal 110 and transaction device 140 nears completion. In one implementation, the payment information may include a payment type, account, and payment amount. Server 130 may process payment information received from terminal 110.

Server 130 may contact entity 150 on behalf of terminal 110. For example, entity 150 may include a server operated by a party that issued a credit card to terminal 110. Server 130 may send information identifying terminal 110 to entity 150 (block 850). For example, server 130 may send an ESN and a PIN related to terminal 110 to entity 150. Server 130 may further send information identifying transaction device 140 and a payment amount to entity 150. Entity 150 may process identity information related to terminal 110, payment information and/or information about transaction device 140. Entity 150 may authenticate the payment transfer based on the received information.

Server 130 may receive payment information from entity 150 (block 860). For example, server 130 may receive a payment amount that corresponds to a total amount due for a transaction performed between terminal 110 and transaction device 140. Server 130 may send the payment to transaction device 140 on behalf of terminal 110 (block 870).

Implementations described herein may be used in other applications and/or transactions. A user may, for example, use terminal 110 to purchase liquor. A merchant may request information identifying the user via an RFID query to terminal 110. Terminal 110 may send a message to server 130 that identifies terminal 110 and the type of transaction. Server 130 may contact a government agency, e.g., a department of motor vehicles, and may receive personal identification information associated with the user, e.g., a driver's license. Server 130 may send the personal identification information to a transaction device 140 operated by the liquor store. A clerk at the liquor store may view the user's photograph along with the user's date of birth. The clerk may decide to sell liquor to the user based on the personal identification information.

In another implementation, terminal 110 may be carried by a traveler in an airport. Metal detectors at the airport may send an RFID query to terminal 110 carried by the traveler. Terminal 110 may send identifying information to server 130 (e.g., a server operated by a department of motor vehicles) and server 130 may send the traveler's personal identification information, e.g., driver's license information, to a computer terminal operated by airport security for display. Security personnel may view the traveler's identification information on a display. The security personnel may allow the traveler to board a flight based on the personal identification information. In another implementation, the traveler's driver's license photograph may be scanned and/or the traveler's facial features may be captured and provided to other systems/applications, such as a facial feature extraction application that determines whether the traveler is on a watchlist based on the traveler's facial features (e.g., by comparing the traveler's facial features to facial features stored in a watch list database).

Other implementations may be used in still other applications.

CONCLUSION

Implementations may provide third party verification of an identity of a terminal participating in a transaction.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations can be implemented using devices and configurations other than those illustrated in the figures and described in the specification without departing from the spirit of the invention. Devices and/or components may be added and/or removed from the implementations of FIGS. 1-4 depending on specific deployments and/or applications. Further, disclosed implementations may not be limited to any specific combination of hardware, software and/or firmware. In addition, while a series of acts has been described with respect to FIGS. 7-8 the order of acts in FIGS. 7-8 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A server for use in a point of sale/service transaction between a mobile communication device and a first device, the server comprising:
    a first interface to receive, from the mobile communication device and via a first network, identification information associated with the mobile communication device,
    where the identification information is not provided to the first device;
    one or more processors to generate authorization information indicating that the mobile communication device is authorized for the point of sale/service transaction, based on results of a comparison of the identification information to stored identity information associated with a plurality of mobile communication devices;
    a second interface to send, via a second network, the authorization information to the first device, where the first network differs from the second network,
    where the first interface is further to receive, via the first network and from the mobile communication device, first payment information related to the point of sale/service transaction after the second interface sends the authorization information to the first device, and
    where the second interface is further to:
        send, to a second device and via the second network, the stored identity information, associated with the mobile communication device, and the first payment information, to cause the second device to debit, based on the first payment information, a monetary account that is associated with the mobile communication device,
        where the second device is different than the first device,
        receive, from the second device and via the second network, second payment information, where the second payment information indicates that the second device debited the monetary account based on the first payment information, and
        send, via the second network, the indication, associated with the second payment information, to the first device.

2. The server of claim 1, where the identification information comprises:
    a name, an address, a phone number, an electronic serial number, a social security number, a driver's license number, passport information, access information, credit card information, debit card information, a receipt identifier, order information, account information, a personal identification number (PIN), a token, a password, a seed, a secure identification value (SIV), a secure ID, or a code, and
    where the one or more processors are further to compare the identification information to the stored identity information associated with the plurality of mobile communication devices.

3. The server of claim 1, where the first payment information includes information identifying the monetary account, and
    where the first payment information is not sent to the first device.

4. The server of claim 1, where the server stores information associated with the monetary account,
    where the information associated with the monetary account includes information identifying the second device, and
    where the second interface is further to send the identity information and the first payment information to the second device using the information associated with the monetary account.

5. The server of claim 1, where the first device is associated with a first entity that includes a merchant, a service provider, a group, a location, an institution, an agency, a hospital, or an individual,
    where the server is associated a second entity that is different from the first entity,
    where the second device is associated with a third entity that is different from the first entity and the second entity, and
    where the mobile communication device is associated with a fourth entity that is different from the first entity, the second entity, and the third entity.

6. The server of claim 1, where the server stores, when the point of sale/service transaction is completed, information that identifies the first payment information and the second payment information.

7. A mobile communication terminal comprising:
  a communication interface to receive, via a near field communication (NFC) link, first transaction information, from a transaction device, to establish a transaction session between the mobile communication terminal and the transaction device;
  one or more processors to generate, responsive to user input received via a user interface of the mobile communication terminal and based on the first transaction information, identification information identifying the mobile communication terminal;
  where the communication interface is further to:
    send, via a wireless network and responsive to the user input and to receiving the first transaction information, the identification information to a server to validate the identification information for the transaction session, and
    receive, via the NFC link and from the transaction device, second transaction information when the transaction session has been established,
    where the transaction session is established after the server sends, to the transaction device, information that validates the identification information,
    where the identification information is not provided to the transaction device, and
    where the second transaction information includes a payment request associated with the established transaction session; and
  one or more processors to generate, responsive to the payment request, payment information associated with the established transaction session, the payment information including information identifying a payment, associated with the payment request, and information identifying a monetary account that is associated with the mobile communication terminal,
  where the communication interface is further to:
    send, via the wireless network, the payment information, for the established transaction, to the server to process the payment based on the payment information, and
    receive, from the transaction device via the NFC link and when the server has processed the payment, third transaction information that includes a record of a completion of a transaction associated with the established transaction session.

8. The mobile communication terminal of claim 7, where the communication interface comprises:
  a near field communication component to communicate with the transaction device; and
  a far field communication component to communicate with the server.

9. The mobile communication terminal of claim 7, further comprising:
  a display to display a window that includes the first transaction information for the transaction session and at least a portion of the second transaction information, and
  where the user interface is to receive an input, from a user, of a personal identification number (PIN) identifying the user for the established transaction,
  where the one or more processors are further to include the PIN in the identification information, and
  where the least a portion of the second transaction information includes information identifying one or more items, recorded by the transaction device for the established transaction session, that are to be purchased.

10. The mobile communication terminal of claim 7, where the first transaction information includes a request for the identification information, and
  where the identification information comprises:
    a name, an address, a phone number, an electronic serial number, a social security number, a driver's license number, passport information, access information, credit card information, debit card information, a receipt identifier, order information, account information, a personal identification number (PIN), a token, a password, a seed, a secure identification value (SIV), a secure ID, or a code.

11. The mobile communication terminal of claim 7, where the payment information further includes information identifying a type of the payment, and
  where the payment information is not provided to the transaction device.

12. The mobile communication terminal of claim 7, where the server corresponds to a first server and is associated with a first entity,
  where the transaction device is associated with a second entity that is different from the first entity,
  where the monetary account is associated with a second server different than the first server, the second server being associated with a third entity that is different from the first entity and the second entity,
  where the mobile communication terminal is associated with a fourth entity that is different from the first entity, the second entity, and the third entity.

13. A method, performed by a server, for managing a transaction between a portable communication device and a first device, the method comprising:
  receiving, by the server and from the portable communication device via a first network, identification information identifying the portable communication device,
    where the identification information is not transmitted to the first device;
  comparing the identification information to identity information stored by the server;
  generating, by the server, authorization information indicating that the portable communication device is authorized for the transaction, based on a result of comparing the identification information to the stored identity information;
  sending, by the server and via a second network, the authorization information to the first device, where the first network differs from the second network;
  receiving, by the server and via the first network, first payment information, associated with the transaction, from the portable communication device after sending the authorization information to the first device;
  sending, by the server, to a second device, the identity information associated with the portable communication device and the first payment information to cause the second device to debit, based on the first payment information, a monetary account that is associated with the portable communication device;
  receiving, by the server and from the second device, second payment information indicating that the second device debited the monetary account based on the first payment information; and
  sending, by the server and via the first network, the indication, associated with the second information, to the first device.

14. The method of claim 13, where the identification information further identifies a user of the portable communication device, and
where receiving the identification information comprises:
receiving a name, an address, a phone number, an electronic serial number, a social security number, a driver's license number, passport information, access information, credit card information, debit card information, a receipt identifier, order information, account information, a personal identification number (PIN), a token, a password, a seed, a secure identification value (SIV), a secure ID, or a code.

15. The method of claim 13, where the first payment information includes information identifying the monetary account, and
where the first payment information, received by the server, is not provided to the first device.

16. The method of claim 13, further comprising:
receiving, via the first network, upon completion of the transaction, information identifying the completed transaction.

17. The method of claim 16, further comprising:
storing, in a storage device of the server, information related to the portable communication device,
where the information related to the portable communication device includes identification information of a user of the portable communication device, information identifying the monetary account, and information identifying the second device,
where the identity information and the first payment information are sent to the second device based on the information related to the portable communication device; and
updating the information related to the portable communication device based on receiving the information identifying the completed transaction.

18. The method of claim 13, further comprising:
sending, to the second device, information identifying the first device,
where the monetary account is debited further based on the information identifying the first device,
where the server is associated with a first entity, and
where the second device is associated with a second entity that is different from the first entity.

19. The method of claim 13, where the server is associated with a first entity,
where the first device is associated with a second entity that is different from the first entity,
where the second device is associated with a third entity that is different from the first entity and the second entity, and
where the portable communication device is associated with a fourth entity that is different from the first entity, the second entity, and the third entity.

* * * * *